United States Patent
Yang et al.

(10) Patent No.: US 10,352,479 B2
(45) Date of Patent: Jul. 16, 2019

(54) PARALLEL CYLINDER TYPE CHECK VALVE

(71) Applicants: Flowtech Co., Ltd., Incheon (KR); Jae Gu Yang, Incheon (KR)

(72) Inventors: Jae Gu Yang, Incheon (KR); Jai Youl Yang, Jinan-gun (KR); Jae Wook Oh, Incheon (KR); Ji Suk Yang, Incheon (KR)

(73) Assignees: FLOWTECH CO., LTD., Incheon (KR); Jae Gu Yang, Incheon (KR)

( * ) Notice: Subject to any disclaimer, the term of this patent is extended or adjusted under 35 U.S.C. 154(b) by 16 days.

(21) Appl. No.: 15/309,020

(22) PCT Filed: Sep. 11, 2014

(86) PCT No.: PCT/KR2014/008458
§ 371 (c)(1),
(2) Date: Nov. 4, 2016

(87) PCT Pub. No.: WO2015/178544
PCT Pub. Date: Nov. 26, 2015

(65) Prior Publication Data
US 2017/0074421 A1    Mar. 16, 2017

(30) Foreign Application Priority Data
May 19, 2014    (KR) .......................... 10-2014-0059809

(51) Int. Cl.
*F16K 15/03*    (2006.01)
*F16K 47/02*    (2006.01)

(52) U.S. Cl.
CPC ............ *F16K 47/023* (2013.01); *F16K 15/03* (2013.01); *F16K 15/033* (2013.01); *F16K 47/02* (2013.01)

(58) Field of Classification Search
CPC ...... F16K 15/035; F16K 31/12; F16K 47/023; F16K 15/03; F16K 47/02; F16K 15/038; F16K 47/045
(Continued)

(56) References Cited

U.S. PATENT DOCUMENTS 3,069,855 A * 12/1962 Denkowski ......... F15B 11/0725
60/400
5,746,246 A *  5/1998 Yokota ................. F16K 15/033
137/514
(Continued)

FOREIGN PATENT DOCUMENTS

CN         1202229        12/1998
CN       202109038         1/2012
(Continued)

OTHER PUBLICATIONS

EGPO, Office Action of EG 2016-111865 dated Nov. 14, 2018.
(Continued)

*Primary Examiner* — P. Macade Nichols
(74) *Attorney, Agent, or Firm* — Lex IP Meister, PLLC

(57) ABSTRACT

The present invention relates generally to a parallel cylinder-type check valve and, more particularly, to a parallel cylinder-type check valve in which two shock-absorbing dampers are connected in parallel to each other so as to absorb shock when a valve is closed, wherein the length of a rocker arm connected to any one shock-absorbing damper is adjusted to be longer according to the principle of a lever in order to provide a sufficient shock-absorbing effect. Also, the present invention relates to a parallel cylinder-type check valve, which is rapidly closed at a high speed at the time of the initial closing of the valve and is slowly closed at a low speed at the later closing of the valve by means of the
(Continued)

parallel cylinder, thereby preventing noise and vibration, as well as preventing water hammer.

13 Claims, 12 Drawing Sheets

(58) Field of Classification Search
USPC .......................................................... 137/527
See application file for complete search history.

(56) References Cited

U.S. PATENT DOCUMENTS

| 6,343,618 | B1 * | 2/2002 | Britt | ...................... | F16K 15/035 |
| | | | | | 137/512 |
| 2017/0328485 | A1 * | 11/2017 | Yang | ...................... | F16K 15/035 |

FOREIGN PATENT DOCUMENTS

| CN | 202252157 | 5/2012 |
| CN | 104204635 | 12/2014 |
| EP | 3147547 | 3/2017 |
| JP | 60-151473 | 8/1985 |
| JP | 61-094664 | 6/1986 |
| JP | 63-185967 | 11/1988 |
| JP | 08-135814 | 5/1996 |
| JP | 3487372 | 1/2004 |
| KR | 20-1987-0010460 | 7/1987 |
| KR | 20-0170011 | 11/1999 |
| KR | 10-0567927 | 3/2006 |
| KR | 10-0567927 | 4/2006 |
| KR | 10-2012-0081818 | 7/2012 |
| KR | 10-1487748 | 1/2015 |

OTHER PUBLICATIONS

SIPO, Office action of CN 201480078797.5 dated Apr. 16, 2018.
EPO, The extended European search of 15866705.5 dated Jul. 23, 2018.

* cited by examiner

[Fig.1]
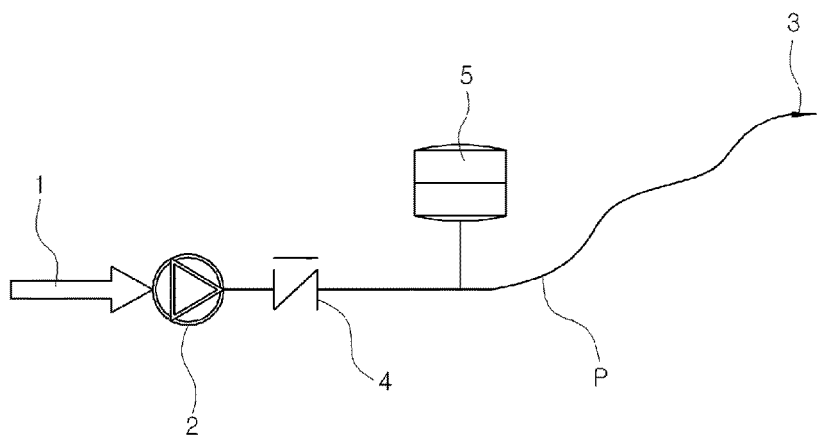
[Fig.2]
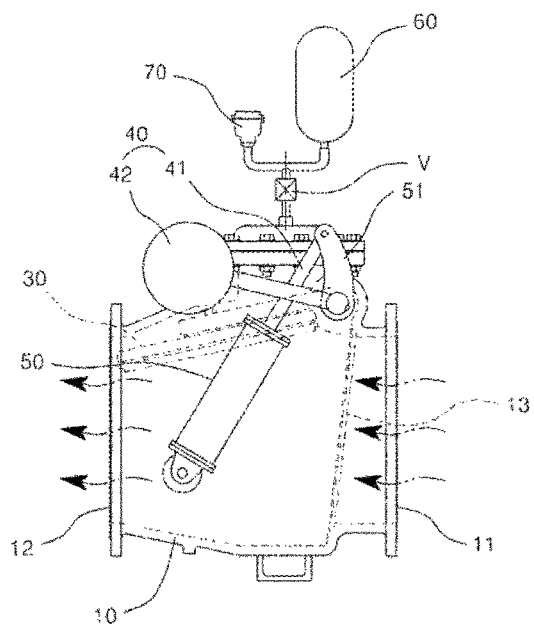

[Fig.3]
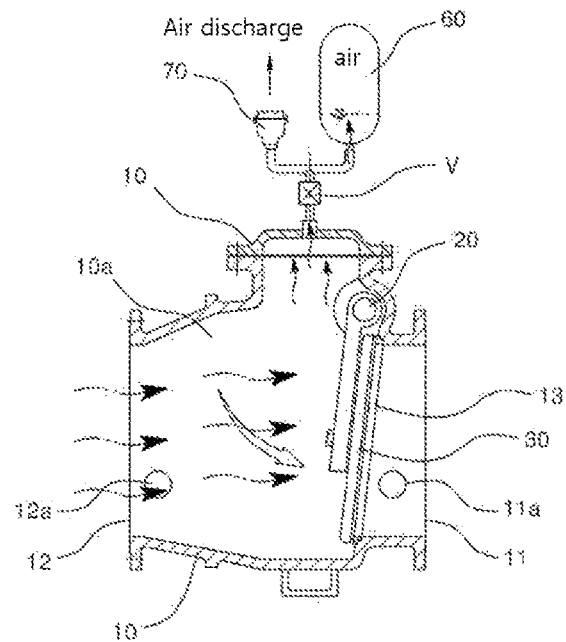
[Fig.4a]
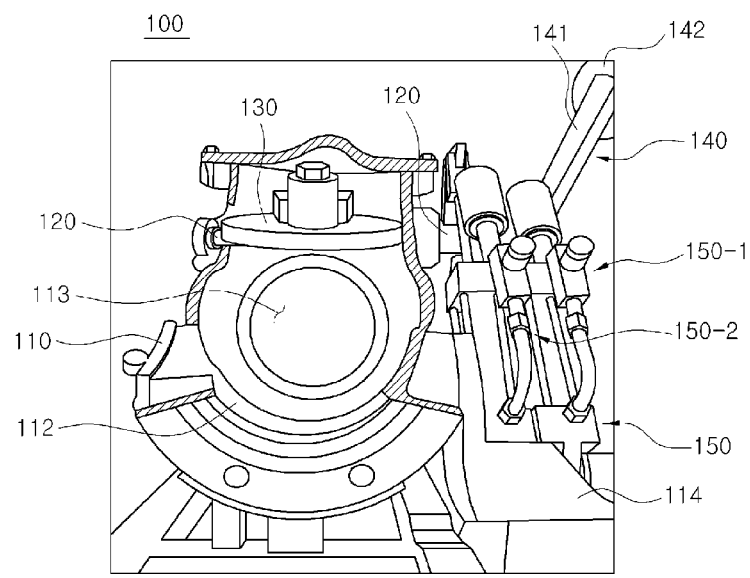

[Fig.4b]
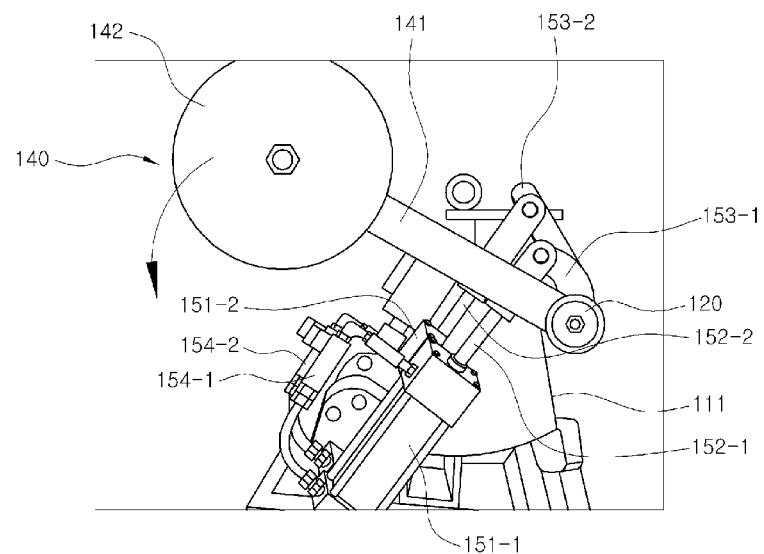
[Fig.5a]
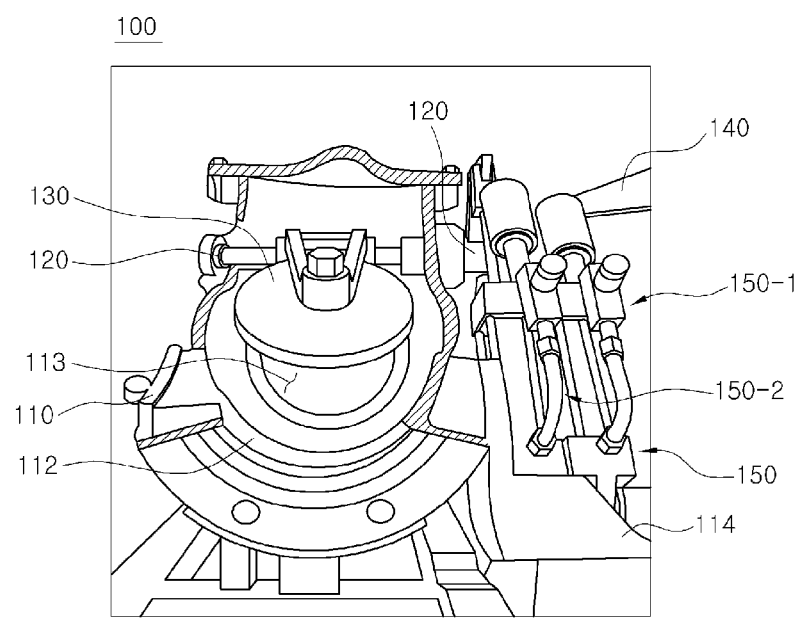

[Fig.5b]
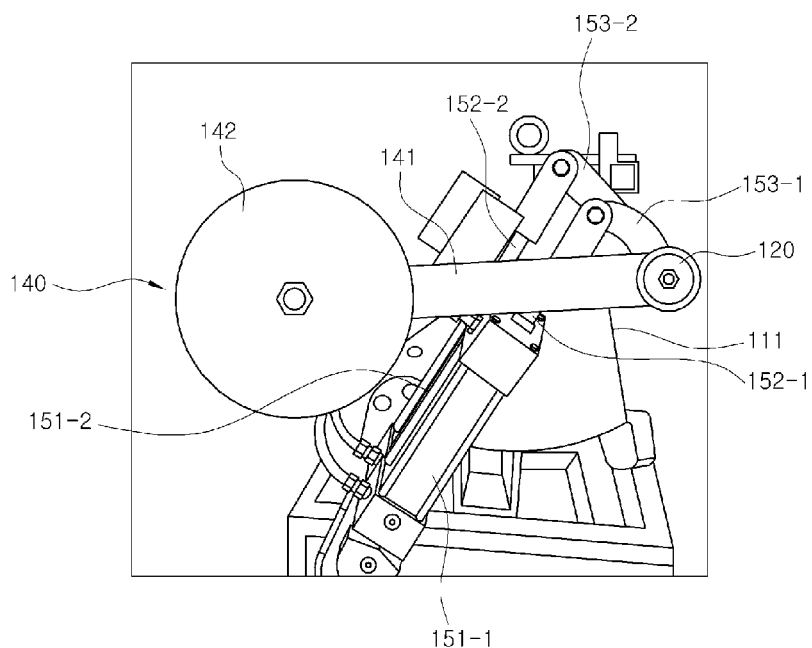
[Fig.6]
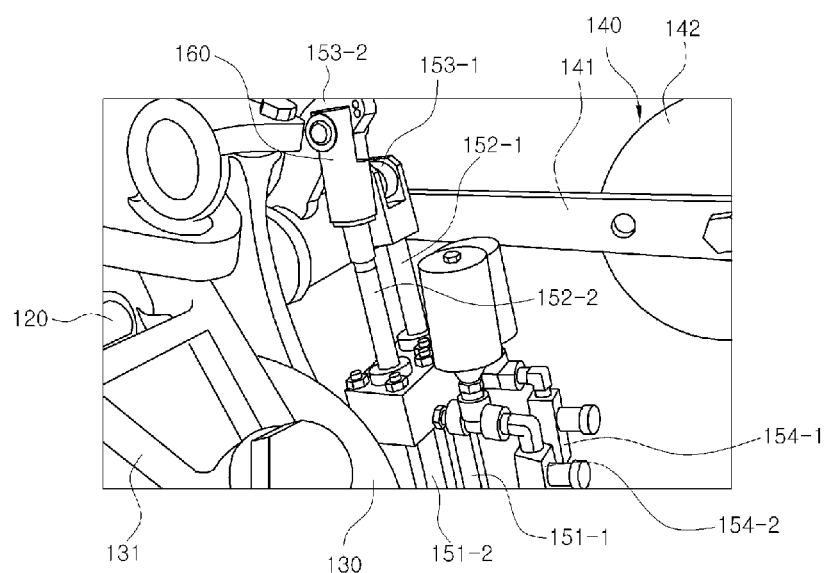

[Fig.7]
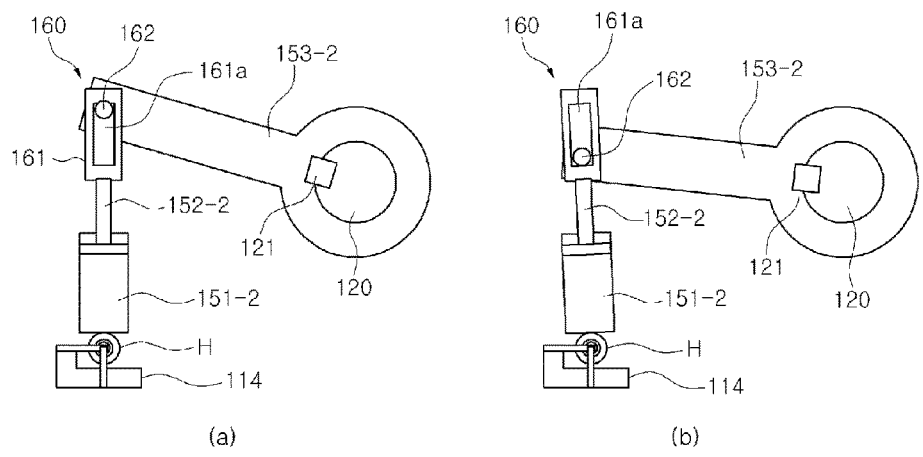
(a)	(b)

[Fig. 8]
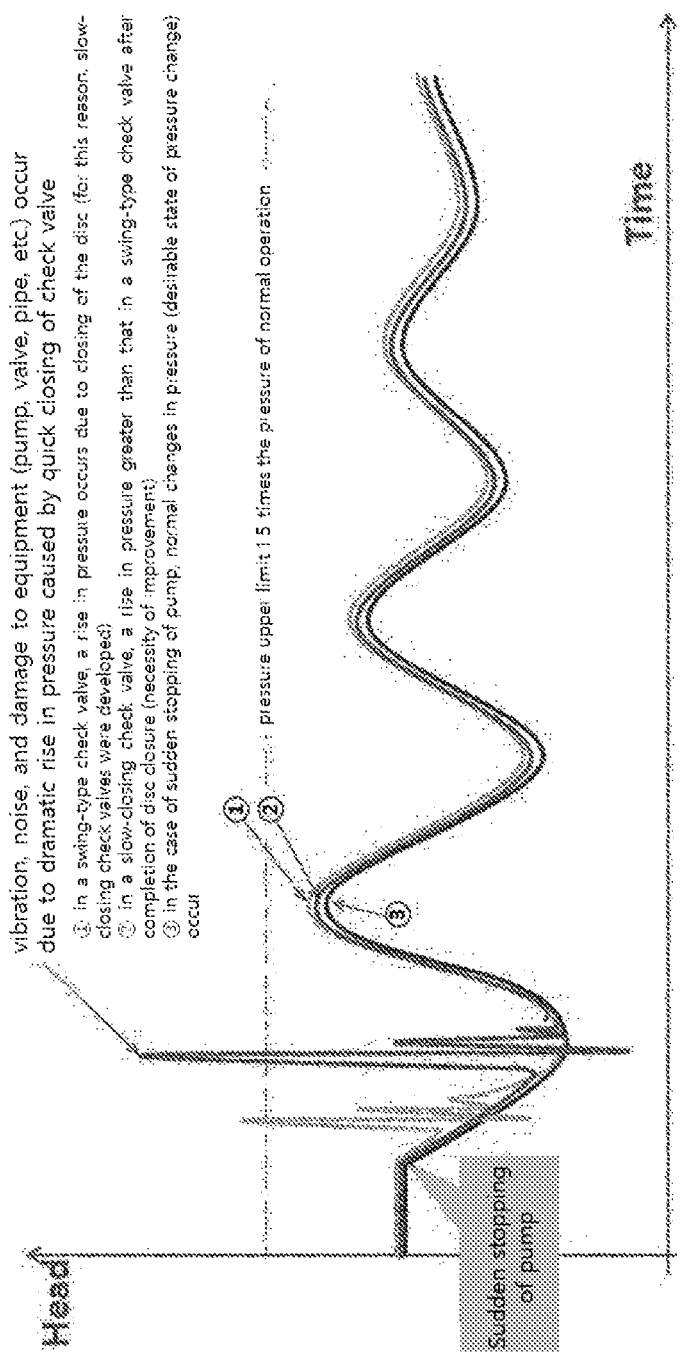

[Fig.9]
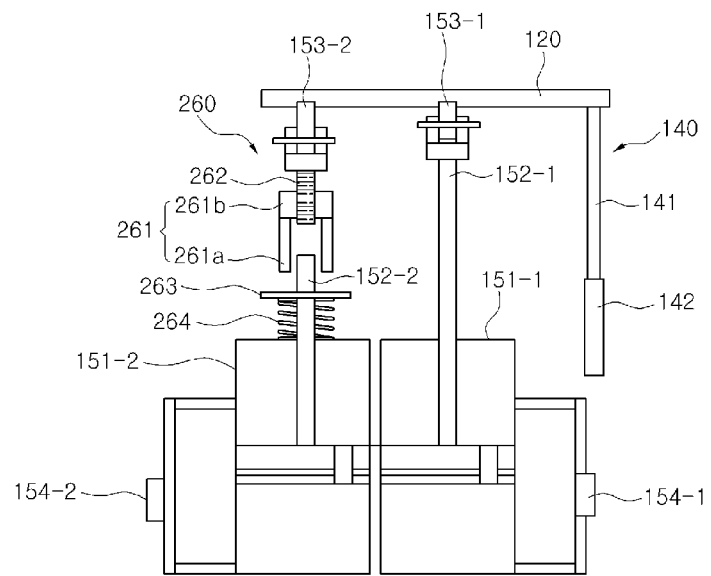
[Fig.10a]
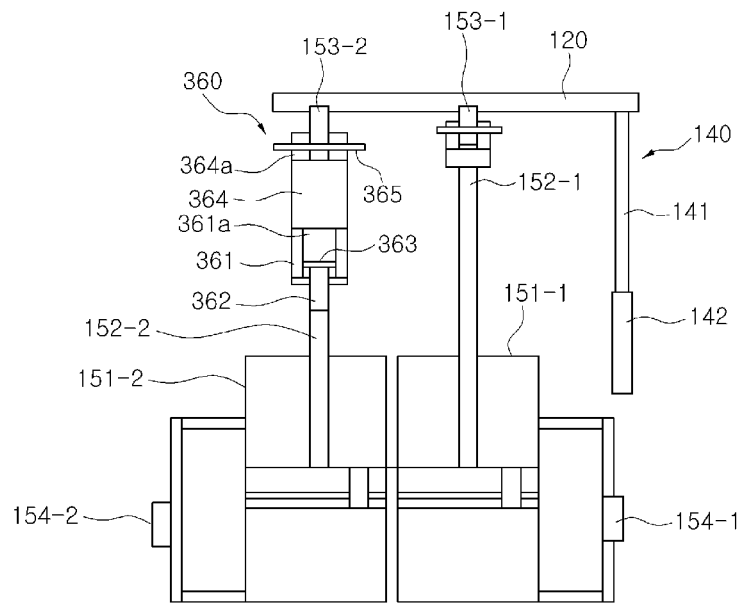

[Fig.10b]
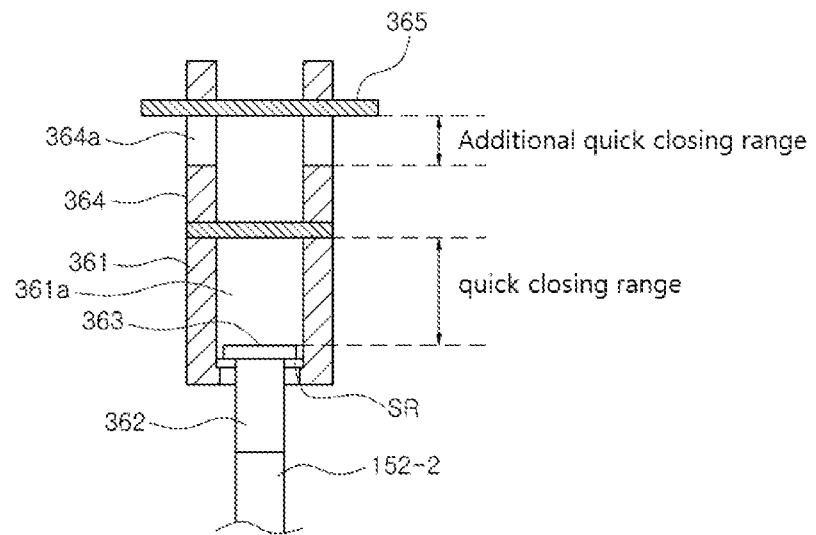
[Fig.10c]
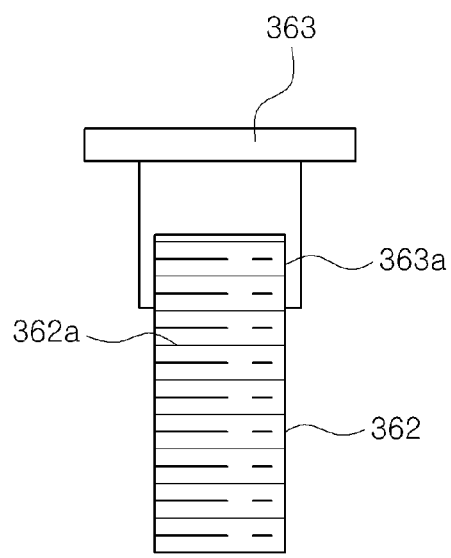

[Fig.11]
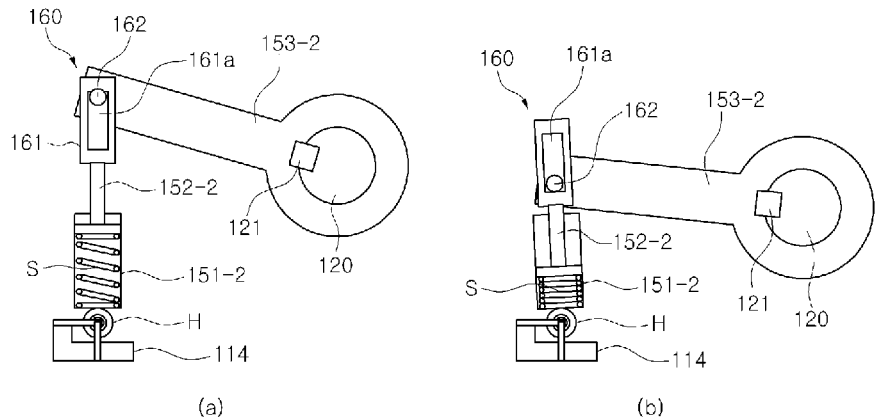
(a)  (b)
[Fig.12]
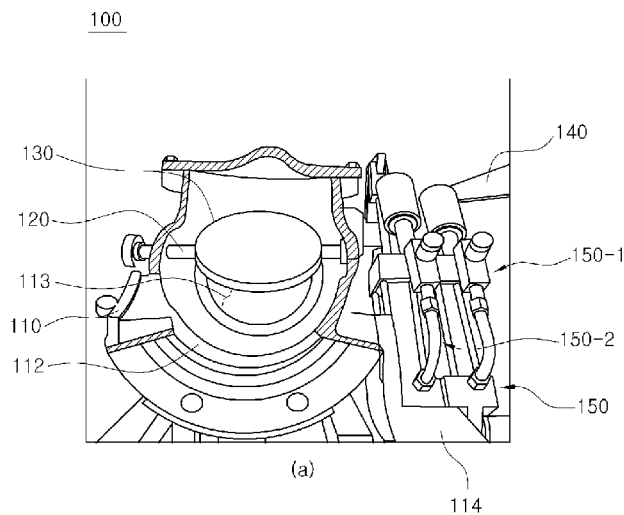
(a)
(b)

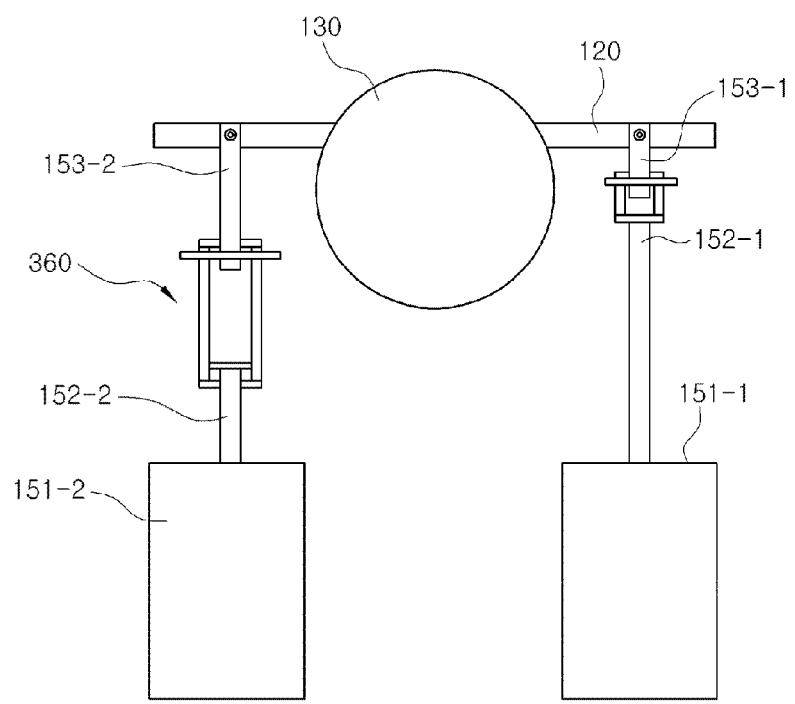
[Fig.13]

[Fig.14a]
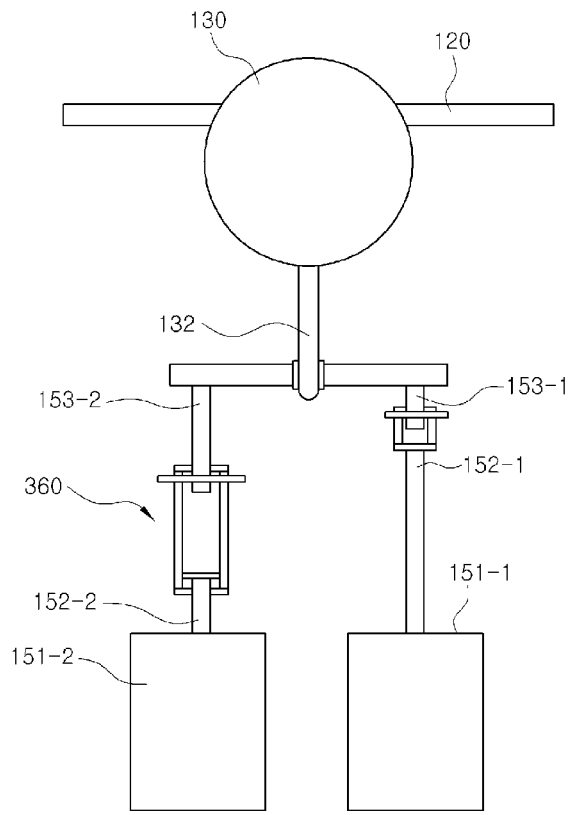
[Fig.14b]
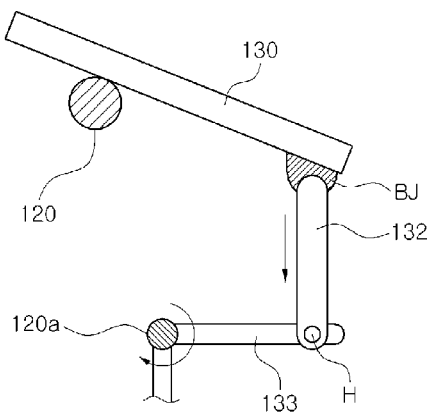

[Fig.15a]
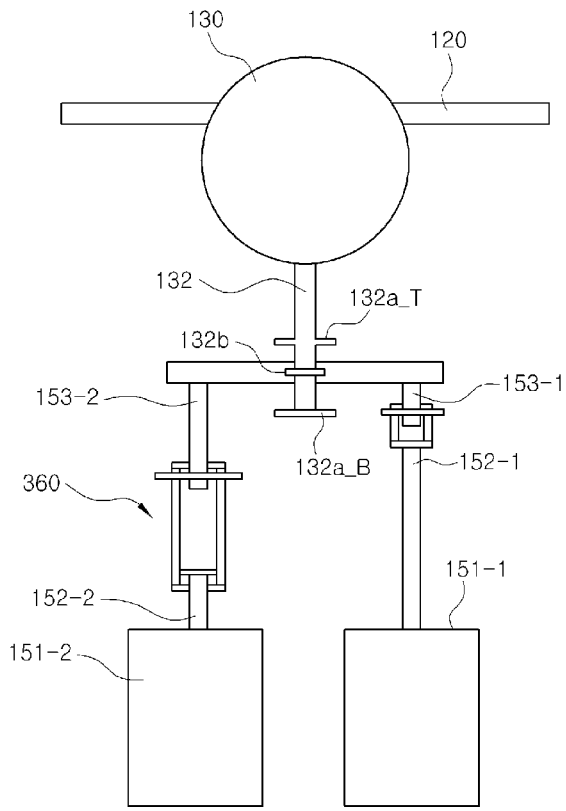
[Fig.15b]
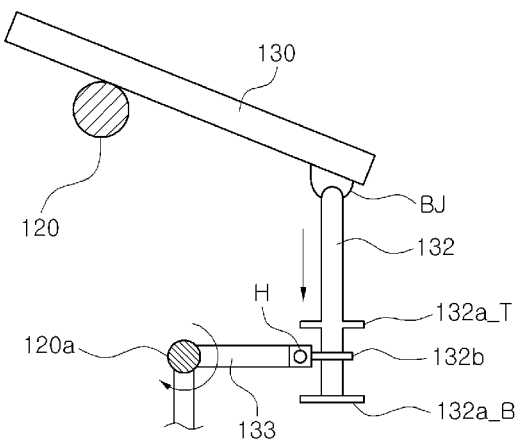

PARALLEL CYLINDER TYPE CHECK VALVE

TECHNICAL FIELD

The present invention relates generally to a parallel cylinder-type check valve. More particularly, the present invention relates to a parallel cylinder-type check valve in which two shock-absorbing dampers are connected in parallel to each other so as to absorb shock when a valve is closed, wherein the length of a rocker arm connected to any one shock-absorbing damper is adjusted to be longer according to the principle of a lever in order to provide a sufficient shock-absorbing effect.

Further, the present invention relates to a parallel cylinder-type check valve, which is rapidly closed at a high speed at the time of the initial closing of the valve and is slowly closed at a low speed at the later closing of the valve by means of the parallel cylinder, thereby preventing noise and vibration, as well as preventing water hammer.

BACKGROUND ART

In general, when a pump is suddenly stopped or a valve closes suddenly in a water pipeline system, a transient condition in which an amount of flow and a hydraulic pressure are dramatically changed occurs. This phenomenon is referred to as water hammer or fluid hammer.

As a result of water hammer, pressure inside a pipe is dramatically increased or is decreased to be lower than saturated vapor pressure such that vapor occurs, and after that, in the process of column separation and return, the pipe may be broken or damaged by a shock wave.

For example, as shown in FIG. 1, a water pipeline system includes: a water supply pump 2 supplying water from an inlet 1 to one direction; a main pipe P with the water being transferred therethrough; and an outlet 3 for discharging the water transferred from the main pipe P.

Further, the main pipe P may be provided not only with a check valve 4 for preventing back flow, but also with a flexible joint for preventing vibration and a shut-off valve for controlling the water flowing through the outlet 3.

Here, when the water supply pump 2 is stopped or the shut-off valve is quickly closed, velocity of flow is dramatically changed in the main pipe P between the inlet 1 and the outlet 3, and thereby water hammer occurs, damaging the main pipe P or the water supply pump 2.

For the above reason, as shown in FIGS. 2 and 3, according to a document of related art, such as Korean Patent application publication No. 10-2013-0093299, a check valve is configured such that a shock-absorbing damper 50 is connected to a rotation shaft 20 of the disc 30, whereby in the case of quick closing of the valve, noise and vibration caused by a collision between a disc 30 and a valve body (for example, a valve seat surface), and water hammer caused by dramatic change in velocity of flow are prevented.

Thereby, as shown in FIG. 2, even when the pump is stopped and the disc 30 moves down by weight of a balance weight 40, the disc 30 is slowly closed, that is, a slow closing function is provided by the shock-absorbing damper 50 constituted by a hydraulic cylinder, and the like.

However, a conventional check valve described above provides the slow closing function, in which the disc 30 is slowly closed, by absorbing shock generated when the disc is closed, through the only single shock-absorbing damper 50. Accordingly, the conventional check valve is problematic in that it is impossible to provide a perfect slow closing function by using the single shock-absorbing damper 50.

The conventional check valve is further problematic in that the slow closing, in which the disc 30 is slowly close, is performed to prevent noise, vibration, water hammer, and the like caused by the quick closing, but during the slow closing, it is impossible to perform a function unique to the check valve, which prevents a fluid from flowing backward.

In other words, if it takes long for the disc 30 to move down to close a passage, during the time, a massive amount of fluid (namely, water) flows backward, and accordingly it is impossible for the check valve to perform its function. Moreover, the back flow may apply a pressure to the stopped water supply pump 2, or may cause a problem by making the water supply pump 2 rotate reversely.

Accordingly, when quick closing of a check valve is performed, noise, vibration, and water hammer occur; and when the slow closing is performed to solve this problem, the back flow of the fluid is increased, so both the quick closing and the slow closing are problematic.

In particular, when the main pipe P is provided with an air chamber 3 to prevent water hammer, the air chamber 3 is expensive, and may accelerate the quick closing of the check valve by a hydraulic pressure caused when make-up water stored in the air chamber 3 is supplied to the main pipe P when the pump is suddenly stopped.

DISCLOSURE

Technical Problem

Accordingly, the present invention has been made keeping in mind the above problems occurring in the related art, and the present invention is intended to propose a parallel cylinder-type check valve in which two shock-absorbing dampers are connected in parallel to each other so as to absorb shock when a valve is closed, wherein the length of a rocker arm connected to any one shock-absorbing damper is adjusted to be longer according to the principle of a lever in order to provide a sufficient shock-absorbing effect.

The present invention is further intended to propose a parallel cylinder-type check valve, which is rapidly closed at a high speed at the time of the initial closing of the valve and is slowly closed at a low speed at the later closing of the valve by means of the parallel cylinder, thereby preventing noise and vibration, as well as preventing water hammer.

Technical Solution

In order to achieve the above object, according to one aspect of the present invention, there is provided a parallel cylinder-type check valve including: a valve body including an inlet and outlet provided respectively on a first side and a second side thereof, with a passage being provided between the inlet and the outlet; an opening and closing assembly, as a rotation structure rotating inside the valve body, opening or closing the passage by a rotation of the rotation structure; a first shock-absorbing damper provided in the valve body, and including: a first bumper absorbing shock; a first shock-absorbing rod connected to the first bumper to transmit shock; and a first rocker arm connected to the first shock-absorbing rod at a first end thereof, and receiving torque from the opening and closing assembly at a second end thereof; and a second shock-absorbing damper provided in the valve body, and including: a second bumper absorbing shock; a second shock-absorbing rod connected to the second bumper to transmit shock; and a second rocker arm connected to the second shock-absorbing rod at a first end thereof, and receiving torque from the opening and closing assembly at a second end thereof, wherein a length of the second rocker arm is longer than a length of the first rocker arm such that by a principle of a lever, a force transmitted to the second bumper by the second rocker arm is smaller than a force transmitted to the first bumper by the first rocker arm.

Preferably, the opening and closing assembly includes: a disc shaft rotatably provided inside the valve body, with longitudinal ends thereof extending outside the valve body; and a disc connected to the disc shaft inside the valve body (110), and opening or closing the passage by a rotation of the disc shaft, wherein the first rocker arm is operated by a rotation of the disc shaft by being connected to the disc shaft, and the second rocker arm is operated by a rotation of the disc shaft by being connected to the disc shaft.

Preferably, the opening and closing assembly includes: a disc shaft rotatably provided inside the valve body, with longitudinal ends thereof extending outside the valve body; a disc connected to the disc shaft inside the valve body, and opening or closing the passage by a rotation of the disc shaft; and a sub-shaft connected to the disc through a shaft-connection arm, and rotated by opening or closing motions of the disc, wherein the first rocker arm is operated in response to a rotation of the sub-shaft by being connected to the sub-shaft, and the second rocker arm is operated in response to a rotation of the sub-shaft by being connected to the sub-shaft.

Here, it is preferred that the first shock-absorbing damper and the second shock-absorbing damper are provided respectively on left and right sides of the valve body to be symmetric based on the valve body.

Further, it is preferred that the second rocker arm is connected to the opening and closing assembly in a state where the second rocker arm is rotated higher than the first rocker arm.

Further, it is preferred that the parallel cylinder-type check valve further include a sliding member for quick closing provided between the second rocker arm and the second shock-absorbing rod, wherein either the second rocker arm or the second shock-absorbing rod is slidably coupled to the sliding member so as to slide along a longitudinal direction of the sliding member by a predetermined length.

Further, it is preferred that the sliding member includes: a sliding block provided with an oblong sliding hole in a longitudinal direction thereof; and a sliding key inserted into the oblong sliding hole of the sliding block so as to slidably move, wherein the second rocker arm is locked to the sliding key, and the second shock-absorbing rod is locked to a lower portion of the sliding block, whereby when the second rocker arm moves down, the sliding key moves to a lowermost end of the oblong sliding hole, and then the second shock-absorbing rod begins to be pressed.

Further, it is preferred that the sliding member includes: a fork for quick closing, the fork including: vertical guides having a predetermined length, and being spaced apart from each other to form a sliding space being open at a lower portion thereof; and a press block locked to the vertical guides to block an upper portion of the sliding space between the vertical guides, wherein the second rocker arm is connected to the press block of the fork, and the second shock-absorbing rod is disposed at the lower portion of the sliding space defined between the vertical guides, whereby as the second rocker arm moves down, the fork moves down, such that the press block comes into contact with the second shock-absorbing rod, and then the second shock-absorbing rod begins to be pressed.

Further, it is preferred that a space adjusting bolt is inserted between the second rocker arm and the press block, wherein a head of the space adjusting bolt is engaged with the second rocker arm, and a body thereof is engaged with the press block of the fork by a screw-type engagement.

Further, it is preferred that a support plate is coupled to the second shock-absorbing rod at a lower location away from an upper end of the second shock-absorbing rod by a predetermined length; and a return spring is provided between a lower surface of the support plate and an upper surface of a body of the second bumper.

Further, it is preferred that the sliding member includes: a ring for quick closing provided with an oblong sliding hole in a longitudinal direction thereof; an up-and-down guide shaft inserted through a lower portion of the ring; and a stop block coupled to an upper end of the up-and-down guide shaft, wherein the second rocker arm is locked to an upper end of the ring, and the second shock-absorbing rod is locked to a lower end of the up-and-down guide shaft, whereby as the second rocker arm moves down, the ring moves down, such that the upper end of the ring comes into contact with the stop block, and then the second shock-absorbing rod begins to be pressed.

Further, it is preferred that a snap ring is fitted over the up-and-down guide shaft, and the snap ring is assembled by being held at the lower portion of the ring.

Further, it is preferred that the up-and-down guide shaft is provided with a length adjusting male thread at an upper portion thereof, and the stop block having a predetermined height is provided with a female thread, such that the up-and-down guide shaft and the stop block are engaged with each other by a screw-type engagement.

Advantageous Effects

According to the present invention having the above-described characteristics, it is advantageous in that a first shock-absorbing damper and a second shock-absorbing damper disposed in parallel to each other are used to prevent a disc from being closed quickly, and thereby it is possible to allow a slow closing motion, in which the disc is closed slowly.

In particular, the present invention is advantageous in that a second rocker arm of the second shock-absorbing damper is longer than a first rocker arm of the first shock-absorbing damper so as to have a lever effect, and thereby by using two shock-absorbing dampers, it is possible to produce an effect of using more than two shock-absorbing dampers.

The present invention is further advantageous in that by using a sliding connection method, the disc freely moves down without applying a pressure to a second bumper at the time of the initial closing of the disc, and thereby it is possible to allow quick closing at the time of the initial closing of the disc, and of course, the present invention allows the above described slow closing. In other words, it is possible to provide both quick closing and slow closing.

DESCRIPTION OF DRAWINGS

FIG. 1 is a schematic diagram showing a system of a conventional water pipeline;

FIG. 2 is a side view showing a state where a check valve according to a conventional art is opened;

FIG. 3 is a side view showing a state where the check valve according to the conventional art is closed;

FIG. 4a is a front view showing a parallel cylinder-type check valve (in an opened state) according to a first embodiment of the present invention;

FIG. 4b is a side view of FIG. 4A;

FIG. 5a is a front view showing the parallel cylinder-type check valve (in a closed state) according to the first embodiment of the present invention;

FIG. 5b is a side view of FIG. 5A;

FIG. 6 is a partial perspective view showing the parallel cylinder-type check valve according to the first embodiment of the present invention;

FIG. 7 is partial operational view showing a parallel cylinder-type check valve according to a second embodiment of the present invention;

FIG. 8 is a graph showing pressure changes in a water pipeline according to quick closing and slow closing of a disc.

FIG. 9 is a partial operational view showing a parallel cylinder-type check valve according to a third embodiment of the present invention;

FIG. 10a is a partial operational view showing a parallel cylinder-type check valve according to a fourth embodiment of the present invention;

FIG. 10b is a partial sectional view showing a ring for quick closing and an up-and-down guide shaft of FIG. 10A;

FIG. 10c is a partial view showing a length adjustable structure of the up-and-down guide shaft of FIG. 10B;

FIG. 11 is view showing a shock-absorbing damper of the parallel cylinder-type check valve according to another embodiment of the present invention;

FIG. 12 is schematic view showing another valve capable of being applied to the parallel cylinder-type check valve according to the present invention;

FIG. 13 is a view showing a parallel cylinder-type check valve according to a fifth embodiment of the present invention;

FIGS. 14a and 14b are views showing a parallel cylinder-type check valve according to a sixth embodiment of the present invention; and FIGS. 15a and 15b are views showing a parallel cylinder-type check valve according to a seventh embodiment of the present invention.

MODE FOR INVENTION

Reference will now be made in greater detail to a parallel cylinder-type check valve according to an exemplary embodiment of the present invention, an example of which is illustrated in the accompanying drawings.

First of all, as shown in FIGS. 4A, 4B, 5A, and 5B, a parallel cylinder-type check valve according to the present invention includes: a valve body 110; a disc shaft 120; a disc 130; a balance weight 140; and a shock-absorbing damper 150. The shock-absorbing damper 150 includes a first shock-absorbing damper 150-1 and a second shock-absorbing damper 150-2.

Here, the disc shaft 120 and the disc 130, as a rotation structure rotating inside the valve body 110, serve to open or close the passage 113 by a rotation of the rotation structure, and is referred as an 'opening and closing assembly', hereinafter.

Meanwhile, the valve body 110 is provided with an inlet 111 allowing a fluid to flow therein, and an outlet 112 allowing the fluid to be discharged therefrom, respectively at a front side and a back side thereof. The passage 113 is provided between the inlet 111 and the outlet 112.

The inlet 111 and the outlet 112 are respectively connected to a water pipeline (see P in FIG. 1) so as to allow a fluid (that is, water) supplied through the water pipeline to flow through the inlet 111, the passage 113, and the outlet 112, wherein the check valve controls a flow of the fluid inside the water pipeline.

According to the embodiment of the present invention, the opening and closing assembly includes the disc shaft 120 and the disc 130. The opening and closing assembly, as a rotation structure rotating inside the valve body 110, serves to open or close the passage 113 by a rotation thereof.

The disc shaft 120 is rotatably mounted inside the valve body 110 through, for example, a bearing, wherein the disc shaft has a length such that longitudinal ends thereof extend outside the valve body 110. The disc shaft 120 is horizontally mounted to an upper portion of the disc 130.

The disc 130 serves to open or close the passage 113 formed in the valve body 110 to control opening or closing the valve, wherein preferably, the disc has the same shape of an open end of the passage 113 so as to securely close the passage 113.

Further, the disc 130 is connected to an outer circumferential surface of the disc shaft 120 through a disc connection arm 131. For example, as shown in the drawings, the disc connection arm 131 may be in an A shape to have a sufficient rigidity.

Accordingly, as shown in FIGS. 4A and 4B, when the disc shaft 120 rotates in one direction, the disc 130 rotates up through the disc connection arm 131, whereby the valve is opened. On the contrary, as shown in FIGS. 5A and 5B, when the disc shaft 120 reversely rotates, the disc 130 rotates down through the disc connection arm 131, whereby the valve is closed.

The balance weight 140 rotates about the disc shaft 120 by being connected to the disc shaft 120 outside the valve body 110, and thereby serves to close the disc 130 so as to close the passage 113.

To achieve this, the balance weight 140 includes: a rotation rod 141 for allowing the disc shaft 120 to be connected thereto; and a weight member 142 having a predetermined weight, wherein a length of the rotation rod 141 and a weight of the weight member 142 may be determined according to the valve capacity, or the like.

Accordingly, when a pump is normally operated, a water pressure that is over the weight of the balance weight 140 is applied to the disc 130, and thereby the balance weight 140 connected to the disc shaft 120 rotates in one direction to move up. In other words, the valve is opened.

On the contrary, when the pump is stopped, the balance weight 140 reversely rotates to move down by the weight thereof, and thereby the disc 130 connected to the disc shaft 120 also moves down and closes the passage 113 so as to close the valve.

However, as publicly known, according to types of valves, the balance weight 140 may be or may be not provided. In the present invention, the balance weight 140 may be not provided.

In the case where the balance weight 140 may be not provided, the disc 130 rotates about the disc shaft 120 by the weight thereof so as to be closed. When the balance weight 140 is provided, it is possible to allow the disc to be closed at a high speed.

The shock-absorbing damper 150 allows the balance weight 140 to move down slowly by exerting force in a direction opposite to a direction where the weight of the balance weight 140 is applied when the pump is stopped and the disc 130 moves down.

As a result, the disc 130 is allowed to be closed slowly. In other words, the shock-absorbing damper 150 of the present invention allows slow closing, that is, allows the disc 130 to be closed slowly.

In the case of a direct closing type valve that is not provided with the shock-absorbing damper as in the conventional art, or in the case where the shock-absorbing damper having a weak buffer power is provided, the balance weight 140 moves down at high speed, and the disc 130 connected to the balance weight through the disc shaft 120 is closed at high speed, too. In other words, quick closing is allowed.

However, when the disc is closed quickly, by a collision between the disc 130 and the valve body 110 (for example, a valve seat surface), water hammer as well as noise and vibration, occur due to a sudden change in velocity of flow, so as in the present invention, the shock-absorbing damper 150 is required.

Thus, the parallel-type shock-absorbing damper 150 according to the present invention includes the first shock-absorbing damper 150-1 and the second shock-absorbing damper 150-2, wherein the first shock-absorbing damper 150-1 and the second shock-absorbing damper 150-2 are connected to the disc shaft 120 extending outside the valve body 110 in parallel to each other.

When the first and the second shock-absorbing dampers are connected in parallel to each other, the first shock-absorbing damper 150-1 and the second shock-absorbing damper 150-2 may be respectively provided at right and left sides based on the valve body 110. In this case, the disc shaft 120 should extend to the right and left sides of the valve body 110. Reference will be made in detail to this case, hereinbelow (see FIG. 13).

In another case of connecting the first and the second shock-absorbing dampers to be in parallel to each other, both the first shock-absorbing damper 150-1 and the second shock-absorbing damper 150-2 may be provided on either left or right sides of the valve body 110. In this case, the disc shaft 120 may extend to one side of the valve body 110, which is shown in FIG. 6 as an embodiment.

As shown in FIG. 6, of the two shock-absorbing dampers 150 connected in parallel to each other, the first shock-absorbing damper 150-1 includes a first bumper 151-1, a first shock-absorbing rod 152-1, and a first rocker arm 153-1. The second shock-absorbing damper 150-2 includes a second bumper 151-2, a second shock-absorbing rod 152-2, and a second rocker arm 153-2.

The first bumper 151-1 and the second bumper 151-2 serve to provide buffer power, and the first shock-absorbing rod 152-1 and the second shock-absorbing rod 152-2 are connected respectively to the first bumper 151-1 and the second bumper 151-2 so as to transmit torque of the disc shaft 120 thereto.

Herein, the first shock-absorbing damper 150-1 may be in the form of a hydraulic or a pneumatic cylinder device. In this case, the first bumper 151-1 is a cylinder; and the first shock-absorbing rod 152-1 is a cylinder rod connected to the cylinder.

Further, in the case where a cylinder device is used as the first shock-absorbing damper 150, a first pressure regulating valve 154-1 is generally provided in the damper. The pressure regulating valve 154-1 is also referred as an 'oil control valve', and serves to regulate internal pressure of the cylinder caused by oil pressure inside the cylinder.

In the first shock-absorbing damper 150-1, the first bumper 151-1 is fixed outside the valve body 110. For example, the first bumper may be fixed on a mount 114 that is provided at a lower portion outside the valve body 110. Of course, the first bumper may be installed to a bottom.

The first shock-absorbing rod 152-1 performs a linear reciprocating motion in which the first shock-absorbing rod moves to the inside of a body of the first bumper 151-1 or moves from the inside of the body of the first bumper 151-1 to the outside thereof. Here, since hydraulic pressure or pneumatic pressure is applied to the first shock-absorbing rod 152-1, it is possible to allow the balance weight 140 to move slowly by a buffering effect. Thereby, it is possible to allow slow closing of the disc 130.

The first rocker arm 153-1 is configured such that a first end thereof is connected to the first shock-absorbing rod 152-1, and a second end thereof is fixed to the disc shaft 120. A connection pin, such as a sliding key to be described hereinafter, may be provided at a junction between the first rocker arm 153-1 and the first shock-absorbing rod 152-1.

Similar to the first shock-absorbing damper, the second bumper 151-2 of the second shock-absorbing damper 150-2 may be in the form of a hydraulic or a pneumatic cylinder, and is fixed outside the valve body 110. For example, second bumper 151-2 may be provided next to the first bumper 151-1 so as to be in parallel to each other. Further, the second bumper 151-2 is provided with a pressure regulating valve 154-2.

The second shock-absorbing rod 152-2 performs a linear reciprocating motion in which the second shock-absorbing rod moves to the inside of a body of the second bumper 151-2 or moves from the inside of the body of the second bumper 151-2 to the outside thereof, and allows the disc 130 to be closed slowly in cooperation with the first shock-absorbing rod 152-1.

The second rocker arm 153-2 is configured such that a first end thereof is connected to the second shock-absorbing rod 152-2, and a second end thereof is fixed to the disc shaft 120. In the case where the first bumper 151-1 and the second bumper 151-2 are disposed in parallel to each other, the second rocker arm 153-2 is disposed next to the first rocker arm 153-1 so as to be parallel to each other.

In particular, in the present invention, the second rocker arm 153-2 of the second shock-absorbing damper 150-2 is longer than the first rocker arm 153-1 of the first shock-absorbing damper 150-1. This is because by using two shock-absorbing dampers 150 and by using the principle of a lever, it is possible to produce an effect of using more than two shock-absorbing dampers 150.

For example, assuming that a length of the second rocker arm 153-2 is 10, and a length of the first rocker arm 153-1 is 5 to have ratio of 2:1 therebetween, a force applied to the second shock-absorbing rod 152-2 by the second rocker arm 153-2 is 5, and a force applied to the first shock-absorbing rod 152-1 by the first rocker arm 153-1 is 10. In other words, the exerting force and the length are inversely related.

The disc shaft 120 corresponds to a fulcrum, and each of the first rocker arm 153-1 and the second rocker arm 153-2 fixed to the disc shaft 120 serves as a lever. Therefore, when the second rocker arm 153-2 is longer than the first rocker arm 153-1, a force applied by the first rocker arm 153-1 is larger than that applied by the second rocker arm 153-2 when the disc shaft 120 rotates.

In other words, the force applied to the second shock-absorbing rod 152-2 by the second rocker arm 153-2 is smaller than the force applied to the first shock-absorbing rod 152-1 by the first rocker arm 153-1.

Accordingly, even if two cylinders on the market are used, a force transmitted to the second bumper 151-2 through the second rocker arm 153-2 by the balance weight 140 is small, so the disc is closed slowly while overcoming the pressure of the second bumper 151-2. As described above, the present invention provides effect of slow closing of the disc 130, which is more than that produced by simply using two cylinders.

However, as shown in the drawings, it is preferred that the second rocker arm 153-2 having a length longer than the first rocker arm 153-1 is fixed to the disc shaft 120 in a state where the second rocker arm is rotated higher than the first rocker arm.

Thereby, it is possible not only to reduce a length protruding forward, but also to allow the rocker arm to be used as an assisting means for adjusting length such that quick closing is allowed by adding a slidably quick closing function to be described in detail hereinbelow.

Meanwhile, the present invention is intended to propose a slow closing function that allows the disc 130 to be closed slowly. However, in the case of providing only the slow closing function, a fluid continues flowing backward for a long time when the slow closing is performed.

Thus, the present invention is further intended to propose a quick closing function that allows the disc 130 to be closed quickly in the beginning.

A quick closing range (or, an angle or a length) may be determined by taking into account various parameters, such as a valve location, a valve capacity, a size of the disc 130, and the like. For example, the quick closing may be performed up to 40%-90% of all degrees of opening of the disc 130.

In other words, in the beginning, that is, when the pump stops and the balance weight 140 starts to move down, the disc 130 is closed quickly. Of course, in the case where the balance weight 140 is not provided, the disc 130 is closed quickly by its own weight.

After the quick closing, the disc 30 is closed slowly by the shock-absorbing damper 150 that provides a bearing force in a direction opposite to a closing direction of the disc 30, and finally closes the valve completely.

In order to achieve the initial quick closing, the present invention further includes a sliding member 160, 260, 360 for quick closing provided between the second rocker arm 153-2 of the second shock-absorbing damper 150-2 and the second shock-absorbing rod 152-2.

Further, either the second rocker arm 153-2 or the second shock-absorbing rod 152-2 is slidably coupled to the sliding member 160, 260, 360 so as to slide along a longitudinal direction of the sliding member 160, 260, 360 by a predetermined length.

Accordingly, even when the balance weight 140 moves down and the disc shaft 120 rotates, the second rocker arm 153-2 or the second shock-absorbing rod 152-2 moves freely along the sliding member 160, 260, 360 for a predetermined length, thereby not exerting any force on the second bumper 151-2.

Thus, even though the disc shaft 120 rotates by the balance weight 140, the first shock-absorbing damper 150-1 connected to the disc shaft normally provides a buffering effect, and on the contrary, the second shock-absorbing damper 150-2 does not provide a buffering effect. In other words, during the initial quick closing, of the two shock-absorbing dampers 150, only the first shock-absorbing damper 150-1 performs a buffering action.

FIG. 7 shows an embodiment of the sliding member 160 allowing the initial quick closing. FIG. 7 (*a*) shows a state where the quick closing begins; and FIG. 7 (*b*) shows a state where the quick closing is completed.

As shown in FIG. 7, the sliding member 160 includes: a sliding block 161 provided with an oblong sliding hole 161*a* in a longitudinal direction thereof; and a sliding key 162 inserted into the oblong sliding hole 161*a* of the sliding block 161 so as to slidably move.

Here, the second rocker arm 153-2 is fixed to the sliding key 162, and the second shock-absorbing rod 152-2 is fixed to a lower portion of the sliding block 161, whereby when the second rocker arm 153-2 moves down, the sliding key 162 moves to a lower-most end of the oblong sliding hole 161*a*, and then the second shock-absorbing rod 152-2 begins to be pressed.

As described above, while the second rocker arm 153-2 moves down by a length of the oblong sliding hole 161*a*, the second rocker arm does not exert any force on the second shock-absorbing rod 152-2. Accordingly, during the above mentioned movement, the second shock-absorbing damper 150-2 does not perform a buffering function. During this period, only the first shock-absorbing damper 150-1 performs a buffering action so as to allow the quick closing.

On the contrary, after the second rocker arm 153-2 moves down to the lower-most end of the oblong sliding hole 161*a* of the sliding block 161, a force is applied to the second shock-absorbing rod 152-2 by the second rocker arm 153-2 moving down, and thereby the second shock-absorbing rod starts to perform a buffering action in cooperation with the first shock-absorbing damper 150-1.

The second bumper 151-2 is connected to the mount 114 at a lower portion of a body thereof by a hinge H, or the like. The disc shaft 120 is engaged with the second rocker arm 153-2 through a clamping key 121, thereby allowing smooth movement.

In FIG. 8, a first graph ① shows pressure changes according to the quick closing in the direct closing type valve that is not provided with the shock-absorbing damper 150. On the contrary, a second graph ② and a third graph ③ show pressure changes in the slow-closing valve that is provided with the shock-absorbing damper 150.

Herein, during slow closing, the second graph ② shows pressure changes in the case where the slow closing fails in the slow-closing valve; and the third graph ③ shows pressure changes in the case where the slow closing is successfully performed in the slow-closing valve.

Through the first graph ① to the third graph ③, two important points are drawn as in the following.

Firstly, the pressure changes in the second graph ② are greater than that in the first graph ①. In other words, water hammer is greater in the case where the slow closing fails in the slow-closing valve than in the case where the quick closing is performed in the direct closing type valve (not shown). Accordingly, it is advantageous to use a direct closing type valve rather than to fail in the slow closing.

Secondly, since a force applied to the disc 130 is gradually increased when an area exposed to hydraulic pressure is gradually increased while the disc 130 is closed, the slow closing fails as in the second graph ②. Accordingly, a buffering action is required from a predetermined point of process.

For the above mentioned reasons, the present invention is configured such that at the time of the initial closing of the disc 130, the quick closing is performed, and after that, the slow closing is successfully performed by using the shock-absorbing damper 150.

The present invention is capable of minimizing water hammer occurrence through the combination of the quick closing and the slow closing even when the disc 30 is closed by stopping of the pump, as in the third graph ③.

Meanwhile, FIG. 9 shows another embodiment of the sliding member 260 allowing the initial quick closing.

As shown in FIG. 9, the sliding member 260 for quick closing includes: a fork 261 for quick closing, the fork 261 including: vertical guides 261a having a predetermined length, and being spaced apart from each other to form a sliding space being open at a lower portion thereof; and a press block 261b locked to the vertical guides 261a to block an upper portion of the sliding space between the vertical guides.

Here, the second rocker arm 153-2 is connected to the press block 261b of the fork 261, and the second shock-absorbing rod 152-2 is disposed at the lower portion of the sliding space defined between the vertical guides 261a.

Accordingly, as the second rocker arm 153-2 moves down, the fork 261 moves down, such that the press block 261b comes into contact with the second shock-absorbing rod 152-2, and then the second shock-absorbing rod 152-2 is begun to be pressed, and thereby the quick closing is performed by a length as high as the length of the sliding space.

Preferably, a space adjusting bolt 262 is inserted between the second rocker arm 153-2 and the press block 261b, wherein a head of the space adjusting bolt 262 is engaged with the second rocker arm 153-2, and a body thereof is engaged with the press block 261b of the fork 261 by a screw-type engagement.

Through this configuration, when the fork 261 is rotated clockwise or counterclockwise, the fork 261 is moved up or down, and thereby it is possible to adjust a gap between the fork and the second shock-absorbing rod 152-2. In other words, it is possible to adjust the quick closing range.

Further, it is preferred that a support plate 263 is coupled to the second shock-absorbing rod 152-2 at a lower location away from an upper end of the second shock-absorbing rod by a predetermined length; and a return spring 264 is provided between a lower surface of the support plate 263 and an upper surface of a body of the second bumper 151-2.

Through this configuration, when after moving down, the fork 261 moves up again by re-operation of the pump, or the like, it is possible to allow the second shock-absorbing rod 152-2 to move back to an original position thereof by elastic restoring force of the return spring 264.

Next, FIGS. 10a to 10c are views showing further embodiment of the sliding member 360 allowing the initial quick closing.

Firstly, as shown in FIG. 10a, the sliding member 360 for quick closing includes: a ring 361 for quick closing provided with an oblong sliding hole 361a in a longitudinal direction thereof; an up-and-down guide shaft 362 inserted through a lower portion of the ring 361; and a stop block 363 coupled to an upper end of the up-and-down guide shaft 362.

Here, the second rocker arm 153-2 is connected to an upper end of the ring 361, and the second shock-absorbing rod 152-2 is fixed to a lower end of the up-and-down guide shaft 362.

Accordingly, until the ring 361 moves down by the second rocker arm 153-2 and comes into contact with the stop block 363 of the up-and-down guide shaft 362 at the upper end of the ring 361, the quick closing is performed, and after that, the second shock-absorbing rod 152-2 begins to be pressed and the slow closing begins.

The up-and-down guide shaft 362 may be engaged with the ring 361 in a variety of manners. As shown in FIG. 10b, for example, a snap ring SR may be fitted over the up-and-down guide shaft 362, and the snap ring SR is assembled by being held at the lower portion of the ring 361.

Further, as shown in FIG. 10c, it is preferred that the up-and-down guide shaft 362 is provided with a length adjusting male thread 362a at an upper portion thereof, and the stop block 363 having a predetermined height is provided with a female thread 363a, such that the up-and-down guide shaft 362 and the stop block 363 are engaged with each other by a screw-type engagement.

Through this configuration, when the stop block 363 is turned clockwise or counterclockwise, the stop block 363 moves up or down such that the axial position thereof is adjusted within the oblong sliding hole 361a of the ring 361. In other words, the quick closing length is adjusted.

Further, the present invention may be configured such that a link block 364 is further provided between the second rocker arm 153-2 and the ring 361, wherein it is preferred that the link block 364 is formed with a sub-sliding hole 364a along a longitudinal direction of the link block.

Accordingly, when a sliding key 365 is inserted into the sub-sliding hole 364a of the link block 364, then the second rocker arm 153-2 is connected to the sliding key 162, and then the ring 361 for quick closing is fixed to an lower portion of the link block 364, an additional quick closing range is added by the length of the sub-sliding hole 364a.

In other words, the present invention is configured such that the quick closing is allowed not only by the length of the oblong sliding hole 361a of the ring 361, but also by a length as long as the height of the sub-sliding hole 364a of the link block 364, and thereby it is possible to lengthen the quick closing length.

Of course, in the case where the quick closing length is required to be shortened, as described above, by turning the stop block 363, a relative position between the stop block 363 and the up-and-down guide shaft 362 is adjusted.

Meanwhile, in the above description, the shock-absorbing damper 150 is in the form of a hydraulic or a pneumatic cylinder device. Accordingly, the first bumper 151-1 and the second bumper 151-2 are cylinders; and the first shock-absorbing rod 152-1 and the second shock-absorbing rod 152-2 are cylinder rods connected to the cylinders.

However, as shown in FIG. 11, the present invention may be configured such that the shock-absorbing damper 150 is in the form of a spring-type damper. In the case of the spring-type damper, each of the first bumper 151-1 and the second bumper 151-2 is in the form of a spring bumper with a spring S being provided inside a housing, and each of the first shock-absorbing rod 152-1 and the second shock-absorbing rod 152-2 is in the form of a support rod with a support plate being provided at a lower portion of the support rod.

Further, in the above description, of various check valves, a general-type check valve is used as an example. In other words, the check valve configured such that the disc 130 is connected to the disc shaft 120 through the connection arm 131 is used in the above description.

However, the present invention may be applied to a tilting-type check valve that is publicly known. The tilting-type check valve, as shown in FIG. 12 (a), is configured such that the disc shaft 120 is directly connected to the disc 130 at a lower location apart from an upper portion of the disc by a predetermined distance.

Accordingly, as shown in FIG. 12 (b), water pressure is applied to upper and lower portions of the disc 130 simultaneously based on the disc shaft 120, and thereby it is possible to provide secure opening and closing functions.

In other words, the present invention may be applied to various types of valves as long as a direct force or buffered force transmitted through the disc shaft 120 that rotates in conjunction with the disc 130 allows the quick closing and the slow closing to be performed.

Further, in the above description, both the first shock-absorbing damper 150-1 and the second shock-absorbing damper 150-2 are provided on the one side based on the valve body 110.

However, as shown in FIG. 13, the present invention may be configured such that the first shock-absorbing damper 150-1 and the second shock-absorbing damper 150-2 are provided respectively on left and right sides of the valve body 110 to be symmetric based on the valve body 110.

As described above, when the first shock-absorbing damper 150-1 and the second shock-absorbing damper 150-2 are separately provided on the right and left sides of the valve body 110, the balance is adjusted from right and left sides of the valve body when shock is absorbed by the buffering action, and thereby it is possible to improve stability. Thus, it is possible to prevent shaking of the valve, and is possible to improve overall flexibility when the valve is closed.

Meanwhile, in the above embodiments, the opening and closing assembly is constituted by the disc shaft 120 and the disc 130, wherein the shock-absorbing damper 150 is connected to the disc shaft 120 of the opening and closing assembly.

However, the present invention may be applied to an opening and closing assembly, which is constituted by the disc shaft 120, the disc 130, and a sub-shaft 120a, wherein the shock-absorbing damper 150 is connected to the disc 130 of the opening and closing assembly.

FIG. 14a is a partial enlarged front view showing the shock-absorbing damper 150 connected to the opening and closing assembly; and FIG. 14b is a partial enlarged side view showing the shock-absorbing damper 150 connected to the opening and closing assembly.

As shown in the drawings, the opening and closing assembly includes the disc shaft 120, the disc 130, and the sub-shaft 120a, wherein the sub-shaft 120a is connected to the disc 130 through the shaft-connection arm 132, thereby rotating in conjunction with the opening and the closing motions of the disc 130.

Here, a bottom surface of a lower end portion of the disc 130 is movably connected to an upper end of the shaft-connection arm 132 by using a ball joint BJ; and a lower end of the shaft-connection arm 132 is connected to a shaft connector 133 by using a hinge H. The shaft connector 133 is fixed to the sub-shaft 120a.

Accordingly, when the disc 130 moves down, the sub-shaft 120a rotates through both the shaft-connection arm 132 and the shaft connector 133, and rotations of the sub-shaft 120a serve a function similar to that of the above described disc shaft 120.

Therefore, when the sub-shaft 120a is provided with both the first shock-absorbing damper 150-1 and the second shock-absorbing damper 150-2 by connecting therewith, as in the above description, both the quick closing and the slow closing of the valve are allowed.

In other words, the first rocker arm 153-1 is connected to the sub-shaft 120a to be operated by a rotation of the sub-shaft 120a, and the second rocker arm 153-2 is also connected to the sub-shaft 120a to be operated by a rotation of the sub-shaft 120a, thereby allowing the quick closing and the slow closing.

Herein, a means for rotating the sub-shaft 120a by being connected to the disc 130 constituting the opening and closing assembly is not limited to a predetermined means, so as shown in FIG. 15, the disc 130 and the sub-shaft 120a may be connected to each other.

FIG. 15a is a partial enlarged front view showing the shock-absorbing damper 150 connected to the opening and closing assembly, and FIG. 15b is a partial enlarged side view showing the shock-absorbing damper 150 connected to the opening and closing assembly.

In FIGS. 15a and 15b, the shaft-connection arm 132 connected the ball joint BJ is protrudingly provided with an upper stop piece 132a_T and a lower stop piece 132a_B at a lower portion of the shaft-connection arm, wherein the upper stop piece 132a_B and the lower stop piece 132a_T are spaced apart from each other in an axial direction.

Further, an annular ring 132b having a hollow section is fitted between the upper stop piece 132a_T and the lower stop piece 132a_B, wherein the annular ring 132b is engaged with the shaft connector 133 by using the hinge H. The shaft connector 133 is fixed to the sub-shaft 120a.

Accordingly, also in this case, similar to FIGS. 14a and 14b, when the disc 130 moves down, the sub-shaft 120a rotates through the shaft-connection arm 132 and the shaft connector 133; and when the sub-shaft 120a is provided with the first shock-absorbing damper 150-1 and the second shock-absorbing damper 150-2 by connecting therewith, both the quick closing and the slow closing of the valve are allowed.

As described above, although reference to the embodiments has allowed the present invention to be described in more detail, it should be understood that the present invention is not limited to the embodiments but may be variously changed without departing from the technical idea of the present invention.

Therefore, the embodiments disclosed in the present invention are not restrictive but are illustrative, and the scope of the technical idea of the present invention is not limited to the embodiments. The scope of the present invention should be interpreted by the accompanying claims, and it is to be understood that all technical ideas within the claims fall within the purview of the present invention.

[Description of reference characters of important parts]

| | |
|---|---|
| 110: valve body | 111: inlet |
| 112: outlet | 113: passage |
| 114: mount | 120: disc shaft |
| 130: disc | 131: connection arm |
| 140: balance weight | |
| 150-1, 150-2: shock-absorbing damper | |
| 151-1, 151-2: bumper (cylinder) | |
| 152-1, 152-2: shock-absorbing rod (cylinder rod) | |
| 153-1, 153-2: rocker arm | |
| 154-1, 154-2: pressure regulating valve | |
| 160, 260, 360: sliding member | |

INDUSTRIAL APPLICABILITY

By being applied to a water pipeline system, the present invention may prevent water hammer or fluid hammer, in which an amount of flow and a hydraulic pressure are dramatically changed, when a pump is suddenly stopped or a valve closes suddenly.

The invention claimed is:

1. A parallel cylinder-type check valve comprising:
   a valve body (110) including an inlet (111) and outlet (112) provided respectively on a first side and a second side thereof, with a passage (113) being provided between the inlet (111) and the outlet (112);
   an opening and closing assembly, as a rotation structure rotating inside the valve body (110), opening or closing the passage (113) by a rotation of the rotation structure;
   a first shock-absorbing damper (150-1) provided in the valve body (110), and including: a first bumper (151-1) absorbing shock; a first shock-absorbing rod (152-1) connected to the first bumper (151-1) to transmit shock; and a first rocker arm (153-1) connected to the first shock-absorbing rod (152-1) at a first end thereof, and receiving torque from the opening and closing assembly at a second end thereof; and
   a second shock-absorbing damper (150-2) provided in the valve body (110), and including: a second bumper (151-2) absorbing shock; a second shock-absorbing rod (152-2) connected to the second bumper (151-2) to transmit shock; and a second rocker arm (153-2) connected to the second shock-absorbing rod (152-2) at a first end thereof, and receiving torque from the opening and closing assembly at a second end thereof, wherein
   a length of the second rocker arm (153-2) is longer than a length of the first rocker arm (153-1) such that a force transmitted to the second bumper (151-2) by the second rocker arm (153-2) is smaller than a force transmitted to the first bumper (151-1) by the first rocker arm (153-1).

2. The parallel cylinder-type check valve of claim 1, the opening and closing assembly includes:
   a disc shaft (120) rotatably provided inside the valve body (110), with longitudinal ends thereof extending outside the valve body (110); and
   a disc (130) connected to the disc shaft (120) inside the valve body (110), and opening or closing the passage (113) by a rotation of the disc shaft (120), wherein
   the first rocker arm (153-1) is operated by a rotation of the disc shaft (120) by being connected to the disc shaft (120), and the second rocker arm (153-2) is operated by a rotation of the disc shaft (120) by being connected to the disc shaft (120).

3. The parallel cylinder-type check valve of claim 1, the opening and closing assembly includes:
   a disc shaft (120) rotatably provided inside the valve body (110), with longitudinal ends thereof extending outside the valve body (110);
   a disc (130) connected to the disc shaft (120) inside the valve body (110), and opening or closing the passage (113) by a rotation of the disc shaft (120);
   a shaft-connection arm (132) connected to the disc (130) at an upper end thereof by using a ball joint, and hingedly connected to a first end of a shaft connector (133) at a lower end thereof; and
   a sub-shaft (120a) connected to a second end of the shaft connector (133) so as to be rotated by opening or closing motions of the disc (130), wherein
   the first rocker arm (153-1) is operated in response to a rotation of the sub-shaft (120a) by being connected to the sub-shaft (120a), and the second rocker arm (153-2) is operated in response to a rotation of the sub-shaft (120a) by being connected to the sub-shaft (120a).

4. The parallel cylinder-type check valve of claim 1, wherein
   the first shock-absorbing damper (150-1) and the second shock-absorbing damper (150-2) are provided respectively on left and right sides of the valve body (110) to be symmetric based on the valve body (110).

5. The parallel cylinder-type check valve of claim 1, wherein
   the second rocker arm (153-2) is connected to the opening and closing assembly in a state where the second rocker arm is rotated higher than the first rocker arm (153-1).

6. The parallel cylinder-type check valve of claim 1, further comprising:
   a sliding member (160, 260, 360) for quick closing provided between the second rocker arm (153-2) and the second shock-absorbing rod (152-2), wherein
   either the second rocker arm (153-2) or the second shock-absorbing rod (152-2) is slidably coupled to the sliding member (160, 260, 360) so as to slide along a longitudinal direction of the sliding member (160, 260, 360) by a predetermined length.

7. The parallel cylinder-type check valve of claim 6, wherein
   the sliding member (160) includes: a sliding block (161) provided with an oblong sliding hole (161a) in a longitudinal direction thereof; and a sliding key (162) inserted into the oblong sliding hole (161a) of the sliding block (161) so as to slidably move, wherein
   the second rocker arm (153-2) is locked to the sliding key (162), and the second shock-absorbing rod (152-2) is locked to a lower portion of the sliding block (161), whereby
   when the second rocker arm (153-2) moves down, the sliding key (162) moves to a lowermost end of the oblong sliding hole (161a), and then the second shock-absorbing rod (152-2) is begun to be pressed.

8. The parallel cylinder-type check valve of claim 6, wherein
   the sliding member (260) includes: a fork (261) for quick closing, the fork (261) including: vertical guides (261a) having a predetermined length, and being spaced apart from each other to form a sliding space being open at a lower portion thereof; and a press block (261b) locked to the vertical guides (261a) to block an upper portion of the sliding space between the vertical guides, wherein
   the second rocker arm (153-2) is connected to the press block (261b) of the fork (261), and the second shock-absorbing rod (152-2) is disposed at the lower portion of the sliding space defined between the vertical guides (261a), whereby
   as the second rocker arm (153-2) moves down, the fork (261) moves down, such that the press block (261b) comes into contact with the second shock-absorbing rod (152-2), and then the second shock-absorbing rod (152-2) is begun to be pressed.

9. The parallel cylinder-type check valve of claim 8, wherein
   a space adjusting bolt (262) is inserted between the second rocker arm (153-2) and the press block (261b), wherein
   a head of the space adjusting bolt (262) is engaged with the second rocker arm (153-2), and a body thereof is engaged with the press block (261b) of the fork (261) by a screw-type engagement.

10. The parallel cylinder-type check valve of claim 9, wherein a support plate (263) is coupled to the second shock-absorbing rod (152-2) at a lower location away from an upper end of the second shock-absorbing rod by a predetermined length; and a return spring (264) is provided between a lower surface of the support plate (263) and an upper surface of a body of the second bumper (151-2).

11. The parallel cylinder-type check valve of claim 6, wherein the sliding member (360) includes: a ring (361) for quick closing provided with an oblong sliding hole (361*a*) in a longitudinal direction thereof; an up-and-down guide shaft (362) inserted through a lower portion of the ring (361); and a stop block (363) coupled to an upper end of the up-and-down guide shaft (362), wherein the second rocker arm (153-2) is locked to an upper end of the ring (361), and the second shock-absorbing rod (152-2) is locked to a lower end of the up-and-down guide shaft (362), whereby as the second rocker arm (153-2) moves down, the ring (361) moves down, such that the upper end of the ring (361) comes into contact with the stop block (363), and then the second shock-absorbing rod (152-2) is begun to be pressed.

12. The parallel cylinder-type check valve of claim 11, wherein a snap ring (SR) is fitted over the up-and-down guide shaft (362), and the snap ring (SR) is assembled by being held at the lower portion of the ring (361).

13. The parallel cylinder-type check valve of claim 11, wherein the up-and-down guide shaft (362) is provided with a length adjusting male thread (362*a*) at an upper portion thereof, and the stop block (363) having a predetermined height is provided with a female thread (363*a*), such that the up-and-down guide shaft (362) and the stop block (363) are engaged with each other by a screw-type engagement.

\* \* \* \* \*